3,645,868
METHOD FOR THE PREPARATION OF 1,2-DIBROMO - 2,2-DIHALOETHYL DIALKYL PHOSPHATES
Federico Garcia-Jiménez and Roberto Flores-Segura, Mexico City, Mexico, assignors to Interoceanica S.A., Mexico City, Mexico
No Drawing. Filed June 25, 1970, Ser. No. 49,966
Int. Cl. B01j 1/10
U.S. Cl. 204—158 HA
13 Claims

ABSTRACT OF THE DISCLOSURE

Dialkyl-1,2-dibromo - 2,2-haloethyl phosphates, which are insecticides, are prepared by bromination of the corresponding dialkyl-2,2-dihalovinyl phosphates in presence of a free radical type catalyst and under illumination from a light source.

BACKGROUND OF THE INVENTION

The present invention relates to an improved method for the preparation of 1,2-dibromo-2,2-dihaloethyl-O,O-dialkyl phosphates. This class of compounds is known to provide highly effective pesticides, the various specific compounds being good insecticides and fungicides. They are customarily prepared by the bromination of the corresponding O,O-dialkyl-2,2 - dichlorovinyl-phosphates. However, experience has shown that in the known methods of bromination, the yields and the purity of the resulting bromo derivatives are not satisfactory.

GENERAL DESCRIPTION OF THE INVENTION

In accordance with the present invention, there is provided an improved method for the bromination of O,O-dialkyl-2,2-dichlorovinyl-phosphates to yield a pesticidal product having the general formula:

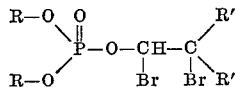

wherein R is alkyl having from 1 to 8 carbon atoms, and R' is halogen.

Examples of R include methyl, ethyl, propyl, isopropyl, n-butyl, isobutyl, tert.-butyl, amyl, isoamyl, tert-amyl, hexyl, and octyl groups. Examples of halogen include chlorine, bromine, iodine and fluorine.

The preferred embodiment of the invention relates to the preparation of dibromo compounds in which alkyl is methyl, and halogen is chloro, and such compounds will be employed for purposes of illustrating the practice of the invention, but this is solely for purposes of exemplification, and is not to be regarded as limiting. The preferred compound O,O-dimethyl-1,2-dibromo-2,2-dichloroethyl phosphate, and compounds having this structure, while exhibiting an elevated insecticidal power, nevertheless are less toxic toward warm-blooded animals.

The bromination of the O,O-dialkyl-2,2-dichlorovinyl-phosphate takes place by the addition of bromine atoms at the double bond. In accordance with the present invention, it has been found that both the yield and purity of the resulting brominated compounds can be greatly enhanced by reacting the starting vinyl compound with elemental bromine in the presence of a free radical type catalyst while simultaneously subjecting the reaction mixture to illumination from a light source. By proceeding in this manner, in accordance with the invention, it is possible to obtain a product which consists almost entirely of the bromine addition compound.

Advantageously the bromination is carried out by slowly adding liquid bromine to the O,O-dialkyl-2,2-dichlorovinyl-phosphate, such as, for example, O,O-dimethyl-2,2-dichlorovinyl-phosphate. However, the bromine may be introduced as a solution thereof in an inert solvent or diluent. The vinyl phosphate starting material is also dissolved in an inert solvent or diluent, together with a small amount of a free radical type promoter, the temperature being maintained between about 0° C. and about 150° C.

The free radical type promoters or catalysts which may be employed in the practice of the invention are substances which decompose with the liberation of free radicals, but which do not form stable combinations with any of the components of the reaction mixture. Such free radical type promoters or catalysts include, for example, acyl peroxides, such as acetyl peroxide, benzoyl peroxide, and lauroyl peroxide; aroylperoxides, such as perbenzoic acid or its esters; peroxides and hydroperoxide of hydrocarbons, such as for example, Tetralin peroxide, di-tert.-butyl peroxide, urea peroxide, diethyl peroxide, dicyclohexyl peroxide, paracymene hydroperoxide, cumene peroxide, diamyl peroxide; and peroxides of compounds which are not hydrocarbons, such as ascaridol peroxide from cyclohexanone, N-bromo-succinamide, N-bromoacetamide, and the like.

There may also be employed as catalysts or promoters, inorganic compounds which produce free radicals, such as the inorganic peroxides, for example, hydrogen peroxide, sodium perborate, potassium persulfate, ammonium persulfate, alkali metal percarbonates, such as those of sodium or potassium, hydrazine derivatives such as hydrazine hydrohalogenides and dibenzoylhydrazine; and organometallic compounds such as tetra-ethyl lead, tri-ethyl aluminum, and other similar compounds. There are preferably employed the hydrocarbon peroxides and the acyl peroxides which initially decompose to yield alkyl or acyl radicals, respectively.

The quantity of catalyst or promoter required is variable, according to the reactants, but at least a catalytic amount is needed. Generally an amount of catalyst between about 0.0002% and about 1% based upon the weight of the dialkyl ester of the 2,2-dihalovinyl phosphate employed is sufficient to produce very good yields of the desired dialkyl-1,2-dibromo-2,2-dihalo-ethyl phosphates. It is not desirable to use an amount of catalyst greater than about 5% by weight, inasmuch as this results in undesired polymerization reactions. In the majority of cases the best yields are obtained by employing an amount of the catalyst between about 0.0002% and about 0.1%.

The light source to which the reaction mixture is subjected may be one which provides either visible or non-visible illumination. The visible illumination may be either polychromatic such as sunlight, or monochromatic such as that emanating from a tungsten or mercury lamp. Preferably there is employed as a light source a tungsten filament lamp having a rating of between about 250 and 2500 watts, provided with a reflector. There may also be employed a mercury arc lamp (Hanovia type) as a light source. A source of ultraviolet light (below 4000 angstroms) or of infrared radiation (greater than 7000 angstroms), may also be used, as well as the visible spectrum or portions thereof (4000–7000 angstroms).

It has been found, surprisingly and unexpectedly, in accordance with the invention, that the simultaneous employment of illumination from a light source, whether that be sunlight, monochromatic light such as that from a tungsten filament, or ultraviolet or infrared light, with the free radical type catalyst, permits of a substantial reduction in the amount of catalyst used, thereby avoiding possible polymerization and other side reactions. The effect appears to be a synergistic effect, and provides a better result than either the catalyst or the light source alone. At the same time, the yield and quality of the product obtained is superior to that obtainable by prior art methods.

The reaction between the dialkyl vinyl phosphate and the bromine can be carried out at any temperature between about 0° C. and about 150° C. The particuular reaction temperature to be used in a particular case depends upon the amount of catalyst employed, as well as upon the intensity of the light used. Preferably the temperature will lie between about 25° C. and about 100° C.

Ordinarily the stoichiometric amount of the bromine is to be used. However, it is desirable to employ a slight excess of bromine, such as about 5% excess. In the majority of cases, the amount of excess bromine that can be used will range from about 0.5% to 5%.

In general, it is better to add the liquid bromine, or a solution thereof in an inert solvent, to the dialkyl vinyl phosphate starting material which is in admixture with the catalyst and an inert solvent. The reaction can also be carried out in the absence of a solvent, but generally it is more convenient to use some solvent, such as, for example, a polyhalogenated aliphatic hydrocarbon, e.g. carbon tetrachloride, hexachloroethane, chloroform, ethylene dichloride, ethylene tetrachloride, and the like. There may also be used as solvents aromatic hydrocarbons, such as benzene, toluene, xylene, and the like, benzene being preferred. There may also be used a halogenated aromatic hydrocarbon, such as chlorobenzene, the dichlorobenzenes, the chlorotoluenes, and the like. The halogenated aliphatic compounds which are preferred are those of low molecular weight, containing up to 4 carbon atoms.

Advantageously, in order to obtain an increased yield of product of greater purity, there is employed at least 20% by weight of the solvent. Preferably, the amount of solvent is at least 40% relative to the weight of the dialkyl vinyl phosphate. Although larger amounts of solvent can be used, it is usually not convenient to employ more than about 90% of solvent. In the majority of cases the optimum proportion of solvent is found to be between about 50% and about 90% in relation to the amount of dialkyl vinyl phosphate used.

The brominated product may be further purified by conventional methods. For example, the solvent can be removed by distillation at reduced pressure in order to avoid decomposition of the product. Finally, the product can be distilled under vacuum to remove polymers.

The following examples serve to illustrate the practice of the invention, but are not to be regarded as limiting:

EXAMPLE 1

Within a glass reactor of 1 liter capacity, equipped with a stirrer, and addition funnel, and a reflux condenser, there is prepared a solution containing 220 g. (1 mol) of dimethyl-2,2-dichlorovinyl-phosphate dissolved in 230 g. of carbon tetrachloride and a total of 0.010 g. benzoyl peroxide. The solution is heated to 80° C. and illumination is begun with a tungsten filament lamp having a reflector and a rating of 250 watts, and then there is added with stirring 166 g. (1.04 moles) of bromine via the addition funnel over a period of 30 to 90 minutes, while maintaining the temperature between 75° and 80° C.

After all the bromine has been added, the mixture is agitated for another 20 minutes, and the solvent is removed under a reduced pressure of about 25–30 mm. Hg, whereupon there is obtained 380 g. of a pale yellow colored product containing 97% by weight of dimethyl-1,2-dibromo-2,2-dichloroethyl phosphate, having a melting point of 26.6° C. If the concentration of the benzoyl peroxide is raised at 0.1%, the yield is 95% and the purity of the product is 92%.

EXAMPLE 2

In order to determine the effectiveness of the various free radical liberating compounds as bromination catalysts, there was performed a series of tests in which the conditions were the same, but only the catalysts were varied. The amount of catalyst used in each instant was 0.01% by weight, based on the amount of dialkyl vinyl phosphate. The temperatures were 80° C. The solvent used was carbon tetrachloride, the amount used, in relation to the vinyl phosphate, being 50%. The reactions were carried out with illumination by means of either a tungsten filament lamp, or an ultraviolet lamp of the Hanovia type, each of 250 watts rating. In each test the amount of bromine was in slight excess of stoichiometric, namely 1 to 5%. Table 1 sets forth the results of these experiments:

TABLE 1

| Catalyst: | Purity of product (percent by wt.) |
|---|---|
| No catalyst | 75 |
| Benzoyl peroxide | 96 |
| tert.-Butyl hydroperoxide | 94.5 |
| Di-tert.-butyl peroxide | 95 |
| Perbenzoic acid | 92 |
| Ascaridol | 91 |
| Hydrogen peroxide (aqueous solution to 35 or 70%) | 94 |
| Potassium peroxide disulfate | 92 |
| Sodium perborate | 90 |
| N-bromo-succinimide | 95 |

From the foregoing data it is seen that the bromination of dialkyl-2,2-dichlorovinyl phosphates yields very pure products when performed, in accordance with the invention, using free radical type catalysts while subjecting the reaction to the visible spectrum or to ultraviolet light. The best results were obtained using benzoyl peroxide and di-tert.-butyl peroxide as catalysts.

What is claimed is:

1. Method for the preparation of O,O-dialkyl-1,2-dibromo-2,2-dihaloethyl phosphates which comprises reacting the corresponding O,O-dialkyl-2,2-dihalovinyl phosphate with bromine in the presence of a catalytic amount of a free radical type catalyst and under simultaneous illumination from a light source.

2. The method of claim 1 in which the amount of bromine employed is from about 0.5% to about 5% in excess of the stoichiometric quantity.

3. The method of claim 1 in which the bromine is in solution in an inert solvent.

4. The method of claim 1 in which the amount of catalyst is between about 0.0002% and about 1% by weight based upon the dialkyl-dihalovinyl phosphate.

5. The method of claim 1 in which the reaction temperature is between about 0° C. and about 150° C.

6. The method of claim 1 in which the starting material is O,O-dimethyl-2,2-dichlorovinyl phosphate.

7. The method of claim 1 in which the catalyst is benzoyl peroxide.

8. The method of claim 1 in which the catalyst is di-tert.-butyl peroxide.

9. The method of claim 1 in which alkyl contains from 1 to 8 carbon atoms.

10. The method of claim 1 in which the product is O,O-dimethyl-1,2-dibromo-2,2-dichloroethyl phosphate.

11. The method of claim 1 in which the light is ultraviolet light.

12. The method of claim 1 in which the light is infrared light.

13. The method of claim 1 in which the light is monochromatic light emanating from a tungsten filament lamp.

References Cited

UNITED STATES PATENTS 2,947,773   8/1960   Allen _____ 204—158

HOWARD S. WILLIAMS, Primary Examiner